United States Patent
Kwon et al.

(10) Patent No.: US 9,162,907 B2
(45) Date of Patent: Oct. 20, 2015

(54) ION EXCHANGER, METHOD OF MANUFACTURING THE SAME, AND ION EXCHANGE FILTER DEVICE AND ELECTRO-DEIONIZATION DEVICE INCLUDING THE SAME

(71) Applicant: Samsung Electronics Co., Ltd., Suwon-Si, Gyeonggi-Do (KR)

(72) Inventors: Bok Soon Kwon, Seoul (KR); Sang Ho Park, Yongin-si (KR); Hyo Rang Kang, Anyang-si (KR); Hyun Seok Kim, Seoul (KR); Joon Seon Jeong, Seoul (KR); Dong Jin Ham, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 98 days.

(21) Appl. No.: 13/675,298

(22) Filed: Nov. 13, 2012

(65) Prior Publication Data

US 2013/0264209 A1   Oct. 10, 2013

(30) Foreign Application Priority Data

Apr. 6, 2012 (KR) .................. 10-2012-0036319

(51) Int. Cl.
*B01J 47/06* (2006.01)
*C02F 1/469* (2006.01)
(Continued)

(52) U.S. Cl.
CPC ............ *C02F 1/4695* (2013.01); *B01D 61/422* (2013.01); *B01D 61/44* (2013.01); *B01D 61/48* (2013.01); *B01D 61/485* (2013.01); *B01D 69/10* (2013.01); *B01D 69/125* (2013.01); *B01D 71/72* (2013.01); *B01J 39/185* (2013.01); *B01J 41/125* (2013.01); *B01J 43/00* (2013.01); *B01J 47/06* (2013.01); *B01J 47/12* (2013.01); *C02F 1/42* (2013.01); *C02F 1/4693* (2013.01); *B01D 2323/225* (2013.01)

(58) Field of Classification Search
USPC .............................................. 204/638; 427/58
See application file for complete search history.

(56) References Cited

U.S. PATENT DOCUMENTS

| 5,783,608 | A | 7/1998 | Sugo et al. | |
|---|---|---|---|---|
| 2003/0189005 | A1* | 10/2003 | Inoue et al. | 210/660 |
| 2004/0241518 | A1* | 12/2004 | Yang | 429/33 |

FOREIGN PATENT DOCUMENTS

| EP | 2590250 | 5/2013 |
|---|---|---|
| GB | 2352987 A | 2/2001 |

(Continued)

OTHER PUBLICATIONS

European Search Report issued in European Patent Application No. 13162574.1, dated Jun. 26, 2013.

(Continued)

*Primary Examiner* — Peter D Mulcahy
*Assistant Examiner* — Henry Hu
(74) *Attorney, Agent, or Firm* — Harness, Dickey & Pierce, P.L.C.

(57) ABSTRACT

An ion exchanger according to a non-limiting embodiment may include an open cell polymer support and a microporous polymer matrix charged within the open cell polymer support. The microporous polymer matrix includes an ion conductive polymer. The ion conductive polymer may be obtained by polymerizing monomers having at least one ion exchange functional group and at least one cross-linkable functional group with a cross-linking agent having at least two cross-linkable functional groups.

31 Claims, 6 Drawing Sheets

(51) Int. Cl.
  *B01J 39/18* (2006.01)
  *B01J 41/12* (2006.01)
  *B01J 43/00* (2006.01)
  *B01J 47/12* (2006.01)
  *B01D 61/42* (2006.01)
  *B01D 69/10* (2006.01)
  *B01D 69/12* (2006.01)
  *B01D 71/72* (2006.01)
  *C02F 1/42* (2006.01)
  *B01D 61/44* (2006.01)
  *B01D 61/48* (2006.01)

(56) References Cited

FOREIGN PATENT DOCUMENTS

| | | | |
|---|---|---|---|
| JP | 10-235122 | * | 9/1998 |
| JP | 10235122 A | | 9/1998 |
| JP | 2005314594 A | | 11/2005 |
| KR | 19960016967 | | 6/1996 |
| KR | 19980013671 A | | 5/1998 |
| KR | 19990072765 A | | 9/1999 |
| KR | 20030018635 A | | 3/2003 |
| KR | 20030070398 A | | 8/2003 |
| KR | 20040098763 A | | 11/2004 |
| WO | WO 2011/025867 | | 3/2011 |
| WO | WO-2011/025867 A1 | * | 3/2011 |
| WO | WO 2011/073638 | | 6/2011 |

OTHER PUBLICATIONS

Yeon, K. et al., "Preparation and Characterization of Cation-Exchange Media Based on Flexible Polyurethane Foams." *Journal of Applied Polymer Science*, vol. 86, 1773-1781. 2002.

* cited by examiner

ION EXCHANGER, METHOD OF MANUFACTURING THE SAME, AND ION EXCHANGE FILTER DEVICE AND ELECTRO-DEIONIZATION DEVICE INCLUDING THE SAME

CROSS-REFERENCE TO RELATED APPLICATION

This application claims priority under 35 U.S.C. §119 to Korean Patent Application No. 10-2012-0036319, filed in the Korean Intellectual Property Office on Apr. 6, 2012, the entire contents of which are incorporated herein by reference.

BACKGROUND

1. Field

An ion exchanger, a method of manufacturing the same, and an ion exchange filter device and an electro-deionization device including the same are disclosed herein.

2. Description of the Related Art

A separation technology for selectively permeating cations and anions using an ion exchange membrane includes an electro-dialysis (ED) process and an electro-deionization (EDI) process. According to the ion concentration of water, the electro-dialysis process is used when the ion concentration is high, and the electro-deionization process is used when the ion concentration is low. The electro-deionization process for treating low ion concentration uses an ion exchange resin that may promote ion transfer, in order to reduce electrical resistance that may be generated and decrease protons and hydroxide ions generated by concentration polarization.

The ion exchange resin is not easy to handle due to its bead shape, and the removal efficiency may be decreased due to a decrease in flow rate, effective reaction area, and the like, which may be caused by partial tilting of the ion exchange resin during operation because of gravity. Further, since the effect on the throughput efficiency may be varied according to the charge density of the ion exchange resin, it is important to install it with a constant density, which is difficult if not impossible.

To overcome drawbacks of the ion exchange resin, various ion conductive spacers are being developed. As the example of the ion conductive spacer, an ion exchange fiber is suggested. The ion exchange fiber may be prepared by producing radicals on a polymer substrate using various irradiation sources such as UV, plasma, and the like on a polyolefin-based polymer substrate such as polypropylene, polyethylene, a polypropylene-polyethylene copolymer, and the like, and forming a branched copolymer while a new polymerization reaction occurs when the polymerizable monomers are contacted starting from the radicals. The ion exchange fiber has merits of being light-weight, and having convenient filter preparation and a fast ion exchange speed. If the ion exchange fiber is applied for an electro-deionization device, a high permeability coefficient may be obtained, and a reaction efficiency decrease over time may be overcome. However, the ion exchange fiber has limits as to how large the volume of the fiber can be and has a low charge density (low ion exchange capacity).

To compensate for drawbacks of the ion exchange fiber, a composite filter has been suggested wherein ion exchange resin particles having high ion exchange capacity are combined with the ion exchange fiber using a solvent-type adhesive. For example, a backbone substrate formed of reticular polyurethane foam is impregnated with an adhesive such as one that is acryl-based, urethane-based, vinyl acetate-based, and the like, and an ion exchange resin is attached to the backbone substrate to prepare an ion exchange filter device. However, when the adhesive covers the ion exchange resin particles, ion exchange capacity may be decreased, and the manufacturing process is complicated due to the use of the adhesive.

Although there is an attempt to introduce an ion exchange functional group in the backbone substrate such as reticular polyurethane foam and the like, there is a problem of low ion exchange capacity.

SUMMARY

Various embodiments provide an ion exchanger that has a relatively high ion exchange capacity and a relatively high permeability coefficient due to a relatively high density charge without using an adhesive.

Various embodiments provide a method of manufacturing the ion exchanger.

Various embodiments provide an ion exchange filter device and an electro-deionization device including the ion exchanger.

According to a non-limiting embodiment, an ion exchanger may include an open cell polymer support and a microporous polymer matrix charged within the open cell polymer support, wherein the microporous polymer matrix includes an ion conductive polymer obtained by polymerizing monomers having at least one ion exchange functional group and at least one cross-linkable functional group with a cross-linking agent having at least two cross-linkable functional groups.

The open cell polymer support may have a porosity of greater than or equal to about 70%.

The open cell polymer support may have a cell size of greater than or equal to about 45 ppi.

The open cell polymer support may include a polymer selected from polyurethane, polyolefin, polyvinylchloride, polycarbonate, polyester, polymethylacrylate, polymethylmethacrylate, polyurea, polyether, polyisocyanurate, and a combination thereof.

The open cell polymer support may be included in an amount of about 3 wt % to about 50 wt %, based on the total amount of the ion exchanger.

The open cell polymer support may further include an ion exchange functional group.

The ion exchange functional group may include a cation exchange functional group such as a sulfonic acid group, a phosphoric acid group, a carboxylic acid group, an imino diacetic acid group, a phosphoric ester group, and the like; an anion exchange functional group such as a quaternary ammonium group, a tertiary amino group, a primary amino group, an imine group, a tertiary sulfonium group, a phosphonium group, a pyridyl group, a carbazolyl group, an imidazolyl group, and the like; or an amphoteric ion exchange functional group such as betaine, sulfobetaine, and the like.

The cross-linkable functional group may include a substituted or unsubstituted C2 to C20 linear or branched alkenyl group, a substituted or unsubstituted C2 to C20 linear or branched alkynyl group, a halogen, —ROR' (wherein R is a substituted or unsubstituted C1 to C20 linear or branched alkylene group and R' is hydrogen or a C1 to C20 linear or branched alkyl group), an acyl halide group (—RC(=O)X, wherein R is a substituted or unsubstituted C1 to C20 linear or branched alkylene group, and X is a halogen), —RC(=O) OR' (wherein R is a substituted or unsubstituted C1 to C20 linear or branched alkylene group, and R' is hydrogen or a C1 to C20 linear or branched alkyl group), an isocyanate group, an acryloyloxy group, a methacryloyloxy group, an acrylate group, a methacrylate group, an acrylamido group, a methacrylamido group, a thiol group, and a combination thereof.

The monomer may be a monomer having a cation exchange functional group selected from α-halogenated vinyl sulfonic acid, α,β,β'-halogenated vinyl sulfonic acid, methacrylic acid, acrylic acid, styrene sulfonic acid, vinyl sulfonic acid, maleic acid, itaconic acid, styrenephosphonic acid, maleic anhydride, vinyl phosphoric acid, salts thereof, esters thereof, and a combination thereof; or a monomer having an anion exchange functional group selected from vinyl pyridine, methyl vinyl pyridine, ethyl vinyl pyridine, vinyl pyrrolidone, vinyl carbazole, vinyl imidazole, amino styrene, alkylamino styrene, alkylamino styrene, trialkyl aminostyrene, methylvinyl ketone, chloromethylstyrene, acrylamide, methacrylamide, and a combination thereof.

The cross-linking agent having at least two cross-linkable functional groups includes an aromatic compound having at least two cross-linkable functional groups, an alicyclic compound having at least two cross-linkable functional groups, or an aliphatic compound having at least two cross-linkable functional groups.

The cross-linking agent having at least two cross-linkable functional groups may be selected from a divinyl-based compound such as m-divinyl benzene, divinyltoluene, divinylxylene, p-divinyl benzene, o-divinyl benzene, divinyl sulfone, butadiene, chloroprene, isoprene, trivinyl benzene, divinyl naphthalene, diallyl amine, triarylamine, divinyl pyridine, divinyldiphenyl ether, divinyldiphenylsulfone, and the like; (meth)acrylate compounds such as alkylene diacrylate, alkylene dimethacrylate, and the like; and a combination thereof.

The monomer and the cross-linking agent may be used in a weight ratio of about 1:0.5 to about 1:20.

The microporous polymer matrix may have an average pore size of about 2 nm to about 100 nm. The ion exchanger may have a specific surface area of about 100 $m^2/g$ to about 1000 $m^2/g$.

The ion exchanger may have permeability coefficient of about 5 to about 25 L/hr·m·atm.

The ion exchanger may have electrical conductivity of about 2500 to about 15,000 μS/cm.

The ion exchanger may have a porosity of about 80% to about 99%.

According to another non-limiting embodiment, a method of manufacturing an ion exchanger may include preparing an open cell polymer support; preparing a composition including monomers having at least one ion exchange functional group and at least one cross-linkable functional group, a cross-linking agent having at least two cross-linkable functional groups, a polymerization initiator, and a solvent; impregnating the open cell polymer support with the composition; conducting a polymerization of the monomers and the cross-linking agent; and then removing the solvent.

According to yet another non-limiting embodiment, an ion exchange filter device may include the ion exchanger.

According to yet another non-limiting embodiment, an electro-deionization device may include the ion exchanger.

DETAILED DESCRIPTION

Figure 1:
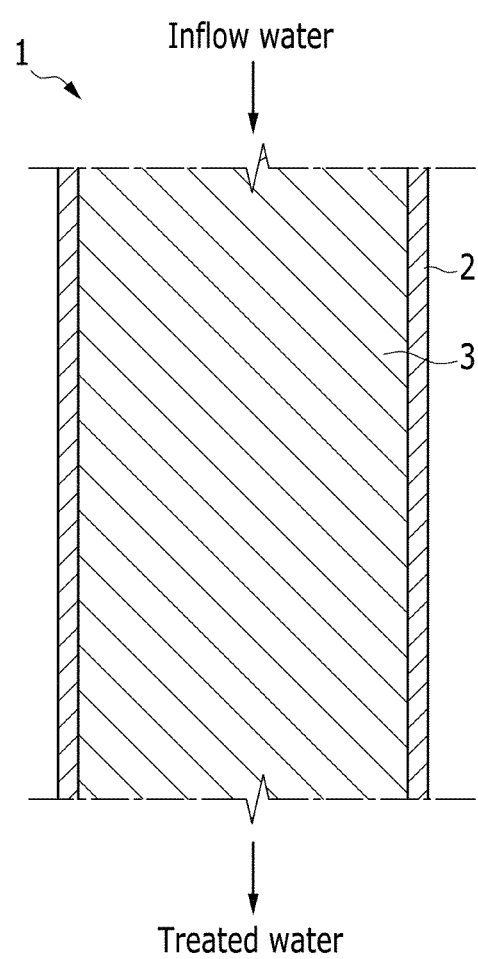
FIG. 1 is a schematic diagram of the ion exchange filter device according to a non-limiting embodiment.

The advantages and characteristics of the present disclosure, and the method of achieving them, will be clearly understood upon referring to the accompanying drawings and example embodiments. However, it should be understood that the present disclosure is not limited to the following example embodiments and may be realized with different embodiments. The present example embodiments are provided to complete the disclosure and aid the understanding of a person having ordinary skill in the art to fully understand the disclosure, and the present disclosure is defined by the claims. Thus, in some example embodiments, well known technologies are not specifically explained to avoid complicating the disclosure. Unless otherwise defined, all terms used in the specification (including technical and scientific terms) may be used as meanings commonly understood to a person having ordinary knowledge in the art. Further, unless explicitly and specifically defined, the terms defined in a generally-used dictionary are not ideally or excessively interpreted. In addition, unless explicitly described to the contrary, the word "include" and variations such as "includes" or "including" will be understood to imply the inclusion of stated elements but not the exclusion of any other elements throughout the specification.

Unless specifically described to the contrary, a singular form includes a plural form.

The example embodiments described in the specification are explained with reference to idealistic drawings of schematic diagrams. Therefore, the parts shown in the drawings have outline properties and they are not to limit the examples. The same reference numerals designate the same constituent elements throughout the specification.

According to a non-limiting embodiment, an ion exchanger may include an open cell polymer support; and a microporous polymer matrix charged within the open cell polymer support, wherein the microporous polymer matrix includes an ion conductive polymer (obtained by polymerizing monomers having at least one ion exchange functional group and at least one cross-linkable functional group with a cross-linking agent having at least two cross-linkable functional groups).

The microporous polymer matrix may be affixed to the open cell polymer support without an adhesive by preparing the ion conductive polymer by cross-linking by a chemical reaction between the monomers and the cross-linking agent in the open cell polymer support. Thus, a high density charge of the ion conductive polymer is enabled.

Since the open cell polymer support has open cells, the ion conductive polymers charged in each cell may easily contact each other to facilitate ion conductivity between ion exchange functional groups. Further, the ion conductive polymer may be uniformly distributed in the open cell polymer support, and has a desirable level of electrical conductivity, and thus the ion exchanger may be useful for an electro-deionization device.

The open cell polymer support may have a porosity of greater than or equal to about 70% (e.g., about 80% to about 98%). If the open cell polymer support has a porosity within the above range, the water permeability of the ion exchanger may be secured, and simultaneously, connection between the ion exchange functional groups of the polymer may be properly achieved, thus smoothly maintaining ion conductivity.

The open cell polymer support may have a cell size of greater than or equal to about 45 ppi, e.g., about 45 ppi to about 100 ppi. In this case, it may sufficiently function as a support for the microporous polymer matrix.

The open cell polymer support may include a polymer selected from polyurethane, polyolefin, polyvinylchloride, polycarbonate, polyester, polymethylacrylate, polymethylmethacrylate, polyurea, polyether, polyisocyanurate, and a combination thereof. The polyolefin may include, for example, polyethylene, polypropylene, polybutylene, polystyrene, a copolymer thereof, and the like.

The open cell polymer support may further include an ion exchange functional group. The ion exchange functional group may be introduced by treating the open cell polymer support with UV or plasma, and then polymerizing monomers having an ion exchange functional group. As the monomer having an ion exchange functional group, the monomer used for preparing the ion conductive polymer may be used.

The open cell polymer support may be included in an amount of about 1 to about 50 wt % (e.g., about 3 to about 10 wt %), based on the total amount of the ion exchanger. Within the above range, uniform distribution and ion exchange capacity of the ion exchange functional groups of the ion exchanger may be properly controlled.

The ion exchange functional group may include a cation exchange functional group such as a sulfonic acid group, a phosphoric acid group, a carboxylic acid group, an imino diacetic acid group, a phosphoric ester group, and the like; an anion exchange functional group such as a quaternary ammonium group, a tertiary amino group, a primary amino group, an imine group, a tertiary sulfonium group, a phosphonium group, a pyridyl group, a carbazolyl group, an imidazolyl group, and the like; or an amphoteric ion exchange functional group such as betaine, sulfobetaine, and the like.

The cross-linkable functional group may be selected from a substituted or unsubstituted C2 to C20 linear or branched alkenyl group, for example a vinyl group, an allyl group, a butenyl group, and the like, a substituted or unsubstituted C2 to C20 linear or branched alkynyl group, a halogen (—F, —Cl, —Br, or —I), —ROR' (wherein R is a substituted or unsubstituted C1 to C20 linear or branched linear or branched alkylene group, and R' is hydrogen or a C1 to C20 linear or branched alkyl group), an acyl halide group (—RC(═O)X, wherein R is a substituted or unsubstituted C1 to C20 linear or branched alkylene group, and X is a halogen), —RC(═O)OR' (wherein R is a substituted or unsubstituted C1 to C20 linear or branched alkylene group, and R' is hydrogen or a C1 to C20 linear or branched alkyl group), an isocyanate group, an isocyanurate group, an acryloyloxy group, a methacryloyloxy group, an acrylate group, a methacrylate group, an acrylamido group, a methacrylamido group, a thiol group, and a combination thereof.

As used herein, when a definition is not otherwise provided, the term "substituted" refers to one substituted with a substituent selected from a fluoro group, a C1 to C30 linear or branched alkyl group, a C3 to C30 cycloalkyl group, a C1 to C20 fluoroalkyl group, a C1 to C20 perfluoroalkyl group ($C_nF_{2n+1}$), a C1 to C30 linear or branched alkoxy group, a C3 to C30 cycloalkoxy group, a C2 to C30 linear or branched alkoxyalkyl group, a C4 to 030 cycloalkoxyalkyl group, and a combination thereof, instead of hydrogen in a functional group.

The monomer may include a monomer having a cation exchange functional group selected from α-halogenated vinyl sulfonic acid, α,β,β'-halogenated vinyl sulfonic acid, methacrylic acid, acrylic acid, styrene sulfonic acid, vinyl sulfonic acid, maleic acid, itaconic acid, styrenephosphonic acid, maleic anhydride, vinyl phosphoric acid, salts thereof, esters thereof, and a combination thereof; or a monomer having an anion exchange functional group selected from vinyl pyridine, methyl vinyl pyridine, ethyl vinyl pyridine, vinyl pyrrolidone, vinyl carbazole, vinyl imidazole, amino styrene, alkylamino styrene, alkylamino styrene, trialkylaminostyrene, acrylamide, methacrylamide, and a combination thereof. Herein, the alkyl may be a C1 to C20 alkyl. The term "halogenated" may refer to a compound where hydrogen is substituted with a halogen (—F, —Cl, —Br, or —I).

The cross-linking agent having at least two cross-linkable functional groups may be an aromatic compound having at least two cross-linkable functional groups, an alicyclic compound having at least two cross-linkable functional groups, or an aliphatic compound having at least two cross-linkable functional groups. These are compounds having at least two cross-linkable functional groups bonded to the aromatic group, alicyclic group, or aliphatic group. The aromatic group may be selected from a C6 to C30 arylene group, a C2 to C30 heteroarylene group including a heteroatom of N, O, or S, and a combination thereof. The alicyclic group may be selected from a C3 to C30 cycloalkylene group, a C2 to C30 heterocycloalkylene group including a heteroatom of N, O, or S, and a combination thereof. The aliphatic group may be selected from a C1 to C20 linear or branched alkylene group, a C1 to C20 heteroalkylene group including a heteroatom of N, O, or S, a C2 to C20 linear or branched alkenylene group, a C2 to C20 heteroalkenylene group including a heteroatom of N, O, or S, and a combination thereof.

In the case of the aromatic compound or alicyclic compound, at least two cross-linkable functional groups are bonded to the aromatic group or alicyclic group. Thus, free rotation of the cross-linkable functional groups is more unlikely to occur, thereby decreasing the possibility of a structural change of the polymer. Therefore, the shape of the pores of the microporous polymer matrix may be relatively uniformly maintained.

The cross-linking agent having at least two cross-linkable functional groups may be selected from divinyl-based compounds such as m-divinyl benzene, divinyltoluene, divinylxylene, p-divinyl benzene, o-divinyl benzene, divinyl sulfone, butadiene, chloroprene, isoprene, trivinyl benzene, divinyl naphthalene, diallyl amine, triarylamine, divinyl pyridine, divinyldiphenyl ether, divinyldiphenylsulfone, and the like; acrylate compounds such as alkylene diacrylatel, alkylene dimethacrylate, and the like; and a combination thereof. Herein, the aryl may be a C6 to C12 aryl, and the alkylene may be a C1 to C20 alkylene.

The monomer and the cross-linking agent may be used in a weight ratio of about 1:0.5 to about 1:20, e.g., about 1:0.7 to about 1:4. Within the above range, the content of the ion exchange functional groups may be controlled with greater ease.

The microporous polymer matrix may include mesopores having an average pore size of about 2 nm to about 100 nm. For example, the mesopores may have an average pore size of about 5 nm to about 90 nm (e.g., about 10 nm to about 80 nm). If mesopores having an average pore size of the above range are formed, water permeability may be at a desirable level, and the possibility of contact between the ion exchange functional groups may be further increased. As such, due to the desirable level of water permeability, the ion exchanger may have a permeability coefficient of about 5 to about 25 L/hr·m·atm (e.g., about 10 to about 25 L/hr·m·atm).

Further, since the possibility of contact between the ion exchange functional groups may be increased, the ion exchange may have an electrical conductivity of about 2500 to about 15,000 μS/cm (e.g., about 2800 to about 15,000 μS/cm). If the ion exchanger has an electrical conductivity within the above range, ion transfer may be facilitated.

The ion exchanger may have a porosity of about 80% to about 99% (e.g., about 85% to 95%). If the ion exchanger has a porosity within the above range, water permeability and the permeability coefficient of the ion exchanger may be improved.

The ion exchanger may have a specific surface area of about 100 m$^2$/g to about 1000 m$^2$/g (e.g., about 150 m$^2$/g to about 800 m$^2$/g). If the ion exchanger has a high specific surface area within the above range, the ion exchange functional groups may be exposed more, thus increasing ion exchange capacity of the ion exchanger.

The ion exchanger may be manufactured by preparing a composition including monomers having at least one ion exchange functional group and at least one cross-linkable functional group, a cross-linking agent having at least two cross-linkable functional groups, a polymerization initiator, and a solvent, impregnating the open cell polymer support with the composition, conducting a polymerization of the monomers and the cross-linking agent, and then removing the solvent.

The monomer, the cross-linking agent, and the open cell polymer support may be as explained with regard to the above-discussed ion exchanger.

As the polymerization initiator, a thermal polymerization initiator may be used without specific limitations, and for example, an azo compound, peroxide, or the like may be used. Specific examples thereof may include 2,2'-azobisisobutyronitrile, benzoyl peroxide, acetyl peroxide, dilauryl peroxide, and the like.

The solvent may include N,N-dimethyl formamide, N-methylpyrrolidone, N,N-dimethylaminopropylamine, ethylene oxide, propylene oxide, tetrahydrofuran, and the like but is not limited thereto.

The solvent removal process may be conducted by supercritical drying, freeze drying, normal pressure drying, and the like.

Since the ion exchanger has a desirable level of water permeability, it may be used for an ion exchange filter device for softening water, an electro-deionization device, and the like, and it may be used for removal of harmful substances such as air pollutants, or removal of heavy metals or recovery of precious metals in wastewater.

Hereinafter, an ion exchange filter device including the ion exchanger is explained referring to FIG. 1.

FIG. 1 is a schematic diagram of the ion exchange filter device 1 according to a non-limiting embodiment. Referring to FIG. 1, the ion exchange filter device 1 includes an ion exchanger 3 charged in a case 2. As the ion exchanger 3, the above explained ion exchanger may be used.

Figure 2:
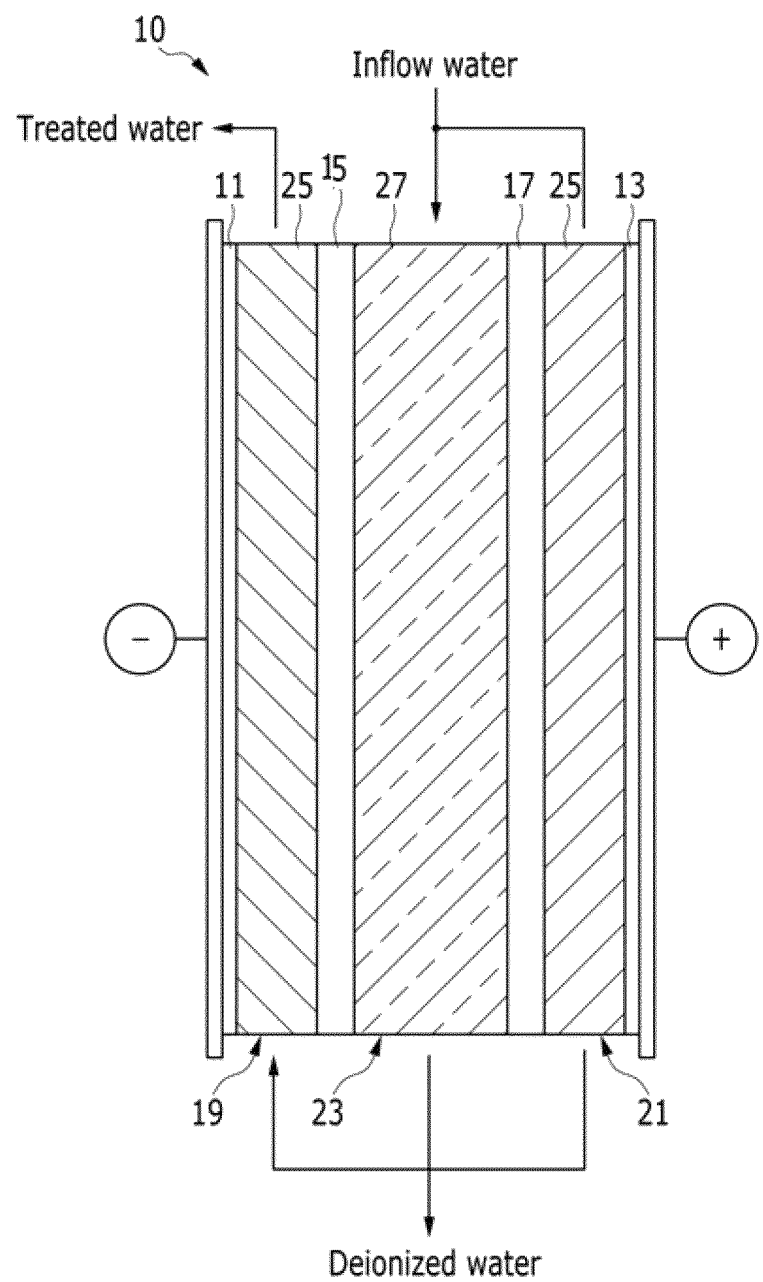
FIG. 2 is a schematic diagram of the electro-deionization device according to a non-limiting embodiment.

An electro-deionization device including the ion exchanger is explained referring to FIG. 2.

FIG. 2 is a schematic diagram of the electro-deionization device 10 according to a non-limiting embodiment. Referring to FIG. 2, a cation exchange membrane 15 and an anion exchange membrane 17 are disposed between a cathode 11 and an anode 13, a cathode chamber 19 (a concentration chamber) is located between the cathode 11 and the cation exchange membrane 15, and an anode chamber 21 (a concentration chamber) is located between the anode 13 and the anion exchange membrane 17. A desalination chamber 23 is located between the cation exchange membrane 15 and the anion exchange membrane 17. The cathode chamber 19 (the concentrate chamber) and the anode chamber 21 (the concentrate chamber) are respectively charged with a cation exchanger 25. As the cation exchanger 25, an ion exchanger having a cation exchange functional group as the ion exchange functional group of the ion conductor may be used. The desalination chamber 23 is charged with an ion exchanger 27 having both a cation exchange functional group and an anion exchange functional group.

Hereinafter, the embodiments are illustrated in more detail with reference to the following examples. However, it should be understood that the following are merely example embodiments of this disclosure and are not intended to be limiting.

Examples 1 to 4

Preparation of Ion Exchanger

A solution is prepared by introducing 2-acrylamido-2-methyl-1-propansulfonic acid as a monomer, 1,3,5-triacryloyl-hexahydro-1,3,5-triazine as a cross-linking agent, and 2,2'-azobisisobutyronitrile (AIBN) as a radical initiator into 1 L on an N,N-dimethyl formamide solvent. The amounts of the monomer and the cross-linking agent are described in the following Table 1, and the radical initiator is used in an amount of 2 parts by weight based on the total amount of 100 parts by weight of the monomers and the cross-linking agent.

An ion conductive polymer is prepared by impregnating open cell polyurethane foam (manufactured by SERIM TTC, SFRSH9-45CG) with the solution, and then polymerizing the monomer and the cross-linking agent in a 70° C. oven for 4 hours. The prepared ion exchanger is impregnated with deionized water to remove the solvent, and is then supercritically dried at 40° C. and 80 atm.

Comparative Example 1

Preparation of Ion Exchanger

While preparing a polyurethane foam by mixing 8 g of diisocyanate (MDI) and 10 g of polypropylene glycol 10 g, an ion exchanger is prepared by introducing 7 g of ion exchange resin particles (Iontec, TRILITE CMP28).

Comparative Example 2

Ion exchange resin particles (Iontec, TRILITE CMP28) are used as an ion exchanger.

Comparative Example 3

A cation exchange fiber (MION-K5, IMATEK&K) is used as an ion exchanger.

Surface Characteristic of Ion Exchanger

Figure 3:
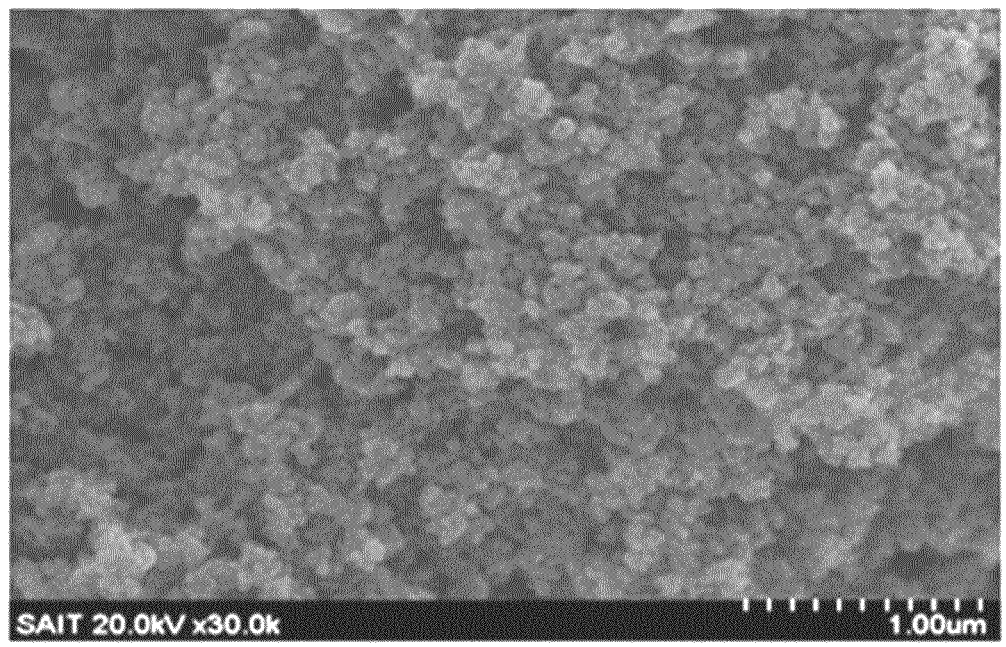
FIG. 3 is a scanning microscope photograph (SEM) of the ion exchanger manufactured in Example 1.
Figure 4:
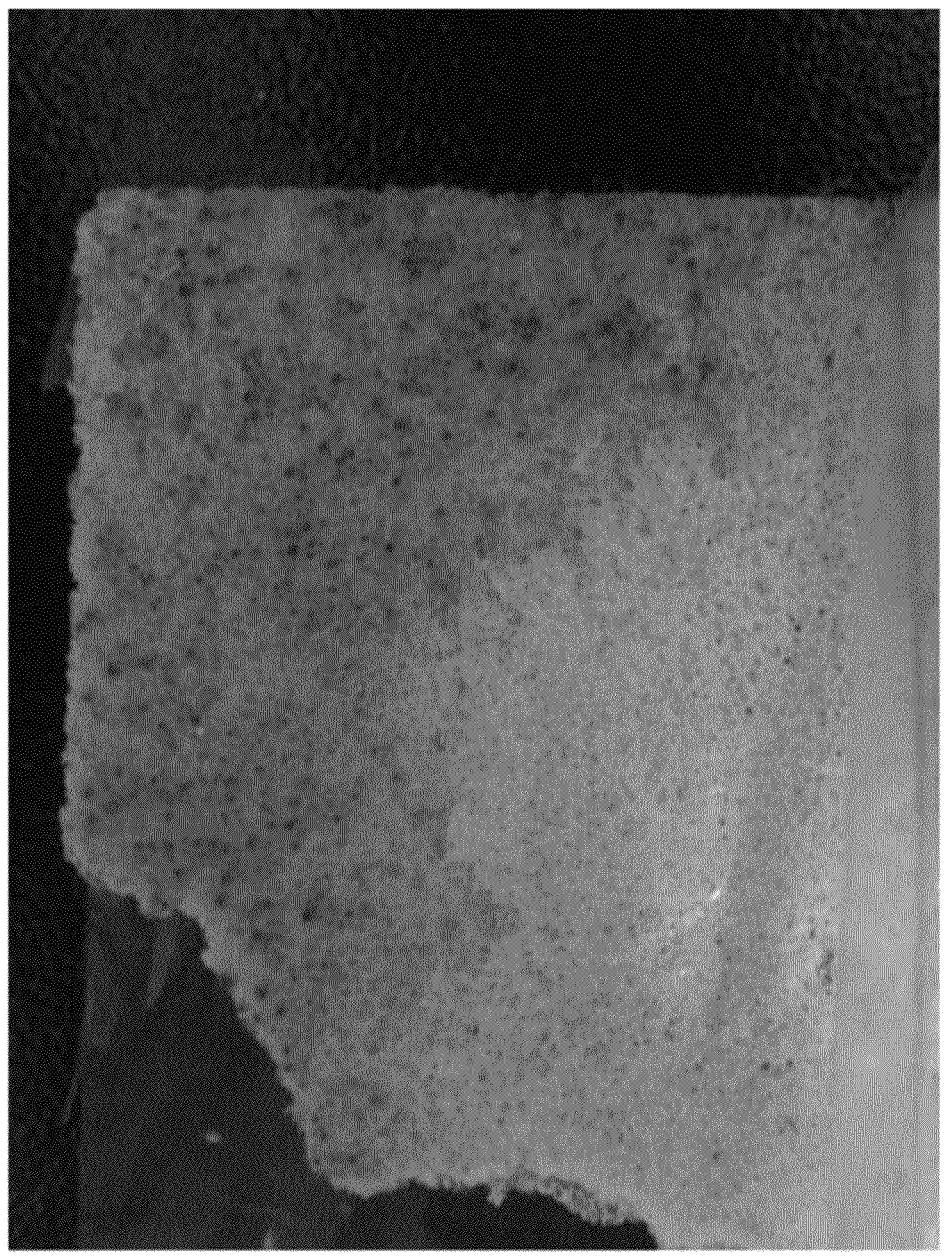
FIG. 4 is an optical photograph of the ion exchanger according to Comparative Example 1.

The scanning electron microscope (SEM) photograph of the ion exchanger prepared in Example 1 is shown in FIG. 3. An optical photograph of the ion exchanger prepared according to Comparative Example 1 is shown in FIG. 4. FIG. 3 shows that mesoporous nanopores are formed in the ion exchanger. In the ion exchanger according to Comparative Example 1 as shown in FIG. 4, the ivory color represents polyurethane foam, and the brown color represents the ion exchange resin particles. From FIG. 4, it is confirmed that the ion exchange resin particles are non-uniformly distributed, and they are not connected with each other.

Measurement of Electrical Conductivity

Electrical conductivity of the ion exchangers of the Examples 1 to 4, Comparative Example 1, and Comparative Example 3 are measured, and are described in the following Table 1. Since Comparative Example 2 is simply ion exchange resin particles, it is impossible to insert them in an electrical conductivity measuring device and measure electrical conductivity. The electrical conductivity is measured as follows. First, the ion exchangers of Examples 1 to 4, Comparative Example 1, and Comparative Example 3 are immersed in a NaCl 21.8 ppm (50.0 µS/cm) solution until the equilibrium state is reached. The ion exchangers are connected between SUS electrodes, an AC power source is connected thereto, and resistance is measured. The electrical conductivity is calculated using the following Equation 1.

$$R = \frac{1}{k}\frac{l}{A} \quad [\text{Equation 1}]$$

In Equation 1, R denotes resistance (Ω), l denotes the distance (cm) between the electrodes, A denotes the area (cm²) of the electrode, and k denotes electrical conductivity (µS/cm).

TABLE 1

| | Weight ratio of monomer and cross-linking agent | Electrical conductivity (µS/cm) |
| --- | --- | --- |
| Example 1 | 5:5 | 10460 |
| Example 2 | 3.32:6.68 | 7687 |
| Example 3 | 2.5:7.5 | 5011 |
| Example 4 | 2:8 | 4307 |
| Comparative Example 1 | — | 56 |
| Comparative Example 3 | — | 408 |

As shown in Table 1, the ion exchangers according to Examples 1 to 4 exhibit higher electrical conductivity than the ion exchangers according to Comparative Example 1 and Comparative Example 3. This shows that, since the ion exchangers of Examples 1 to 4 include ion conductive polymer uniformly distributed in the open cell polymer support, continuous connection between the ion exchange functional groups is achieved, and thus current flow is smoothly achieved under an electrical field. To the contrary, in Comparative Example 1, since the ion exchange resin particles are non-uniformly distributed in the independent cell polymer support, continuous connection between the ion exchange functional groups is not achieved, thus exhibiting low electrical conductivity.

Measurement of Permeability Coefficient

To evaluate water permeability of the ion exchangers of Examples 1 to 4 and Comparative Examples 1 to 3, a permeability coefficient is measured. The permeability coefficient is a factor indicating the amount of permeated water per unit area and unit time. To obtain the permeability coefficient of the ion exchanger, the flow rate is measured with varying pressure. The permeability coefficient is calculated according to the following Equation 2.

$$CP = \frac{J \times L}{\Delta P} \quad [\text{Equation 2}]$$

In Equation 2, CP denotes permeability coefficient, J denotes the amount of permeated water per unit area (l/hr·m²), L denotes a thickness of the ion exchanger, and ΔP denotes pressure change.

Figure 5:
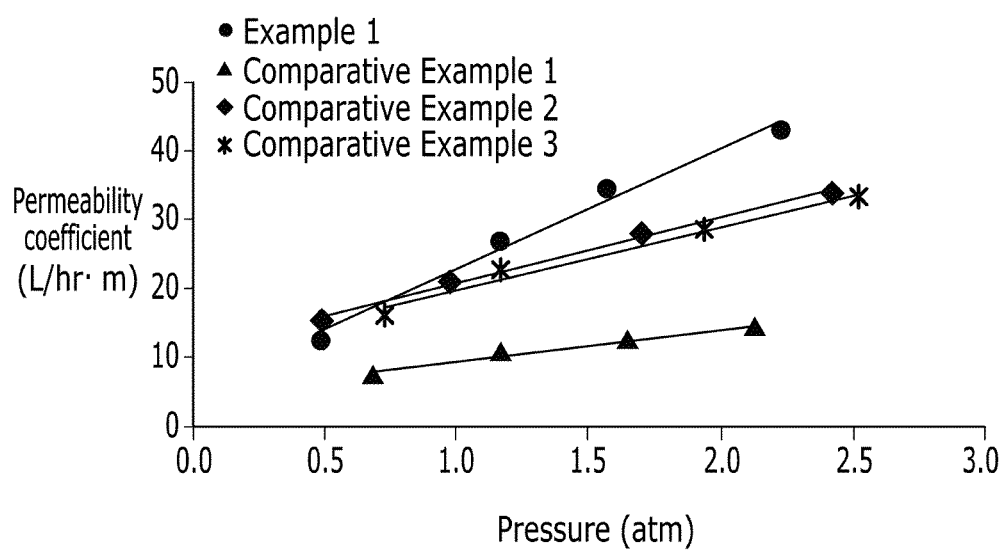
FIG. 5 is a graph showing permeability coefficients of the ion exchangers according to Example 1 and Comparative Examples 1 to 3.

Among them, the permeability coefficients of the ion exchangers of Example 1 and Comparative Examples 1 to 3 are measured and shown in FIG. 5. As shown in FIG. 5, the ion exchanger of Example 1 has a desirable level of water permeability compared to those of Comparative Examples 1 to 3.

Evaluation of Ion Exchange Performance

Figure 6:
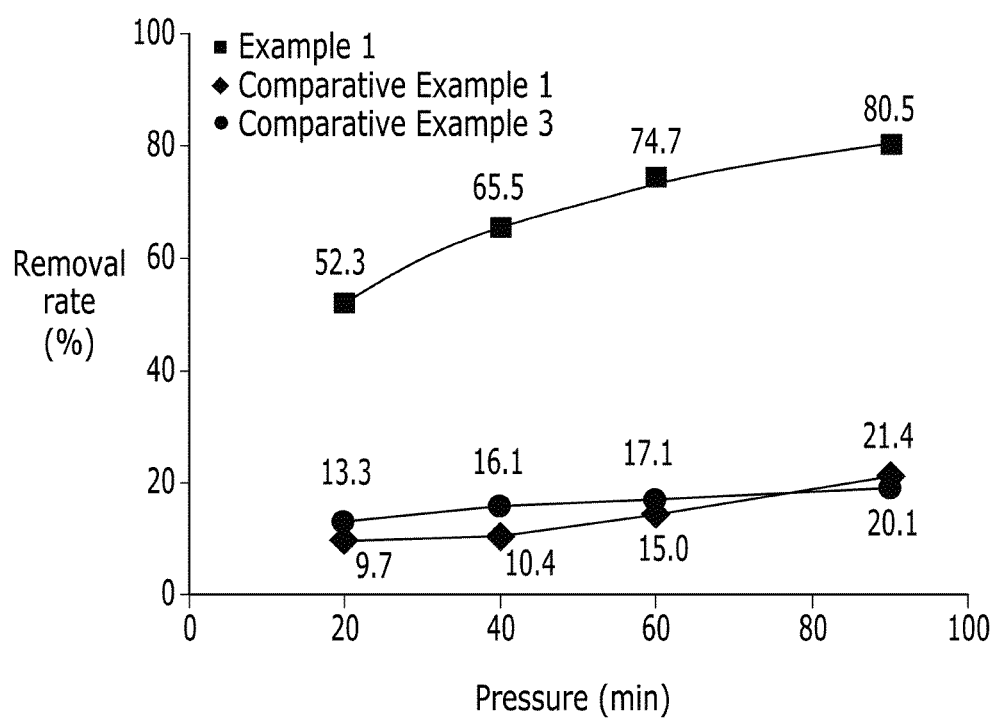
FIG. 6 is a graph showing ion exchange performance (hard ion removal rate) of the ion exchangers according to Example 1, Comparative Example 1, and Comparative Example 3.

Ion exchange performances of the ion exchangers according to the Examples 1 to 4 and Comparative Examples 1 to 3 are evaluated. The ion exchangers of Examples 1 to 4, Comparative Example 1, and Comparative Example 3 are used with the size of 2.9 cm (L)×1 cm (W)×0.7 cm (H) (volume 2 cm³), and the ion exchanger of Comparative Example 2 is used in the amount of 2 mL. After being immersed in a $CaCl_2 \cdot 2H_2O$ solution (100 mL of $CaCO_3$ at 472 mg/L), supernatant is collected at 20 minutes, 40 minutes, 60 minutes, and 90 minutes, and the concentration of calcium ions is measured by ion chromatography. Among them, the measurement results of Example 1, Comparative Example 1, and Comparative Example 3 are shown in FIG. 6. From FIG. 6, it can be seen that Example 1 has an improved hard ion (calcium ion) removal rate, compared to Comparative Example 1 and Comparative Example 3.

Ion Exchange Performance According to the Amount of Monomer

For the ion exchangers according to Examples 1 to 4, Comparative Example 1, and Comparative Example 2, ion exchange capacity according to the amount of monomer is measured. The ion exchangers of Examples 1 to 4 and Comparative Example 1 are used with the size of 2.9 cm (L)×1 cm (W)×0.7 cm (H) (volume of 2 cm³), and the ion exchanger of Comparative Example 2 is used in the amount of 2 mL. The ion exchangers of Examples 1 to 4, Comparative Example 1, and Comparative Example 2 are immersed in a $CaCl_2 \cdot 2H_2O$ solution (100 mL of $CaCO_3$ at 472 mg/L), and the ion concentration when the equilibrium state is reached is calculated to measure ion exchange capacity. Among them, the results of Example 1, Comparative Example 1, and Comparative Example 2 are described in the following Table 2. The amount of monomer of each ion exchanger is calculated and described in Table 2.

TABLE 2

| | Amount of monomer (g) | Ion exchange capacity (eq/L) |
| --- | --- | --- |
| Example 1 | 0.15 | 0.28 |
| Comparative Example 1 | 0.44 | 0.12 |
| Comparative Example 2 | 1.1 | 0.47 |

As shown in Table 2, the ion exchanger of Example 1, although the amount of monomer is only 0.15 g, exhibits more than double the ion exchange capacity compared to the ion exchanger of Comparative Example 1. Also, the ion exchanger of Example 1, although the amount of monomer is about 14% compared to the amount of monomer of Comparative Example 2, exhibits almost 60% of the ion exchange capacity compared to the ion exchange capacity of the ion exchanger of Comparative Example 2. Thus, it is confirmed that Example 1 exhibits a desirable ion exchange capacity while using less monomer compared to Comparative Example 1 and Comparative Example 2.

While this disclosure has been described in connection with various example embodiments, it is to be understood that the examples are not limited to the disclosed embodiments, but, on the contrary, is intended to cover various modifications and equivalent arrangements included within the spirit and scope of the appended claims.

What is claimed is:

1. An ion exchanger, comprising:
   an open-celled polymer support; and
   a microporous polymer matrix within the open-celled polymer support, the microporous polymer matrix comprising an ion conductive polymer, the ion conductive polymer being a polymerized product of monomers and a cross-linking agent, the monomers comprising at least one first ion exchange functional group and at least one first cross-linkable functional group, the cross-linking agent comprising at least two second cross-linkable functional groups, the open-celled polymer support comprising a second ion exchange functional group.

2. The ion exchanger of claim 1, wherein the open-celled polymer support has a porosity of greater than or equal to about 70%.

3. The ion exchanger of claim 1, wherein the open-celled polymer support has a cell size of greater than or equal to about 45 ppi (pores per inch).

4. The ion exchanger of claim 1, wherein the open-celled polymer support comprises a polymer selected from polyurethane, polyolefin, polymethylacrylate, polyvinylchloride, polycarbonate, polyester, polymethylmethacrylate, polyurea, polyether, polyisocyanurate, and a combination thereof.

5. The ion exchanger of claim 1, wherein the open-celled polymer support is included in an amount of about 3 wt % to about 50 wt %, based on a total weight of the ion exchanger.

6. The ion exchanger of claim 1, wherein the at least one first ion exchange functional group is selected from a cation exchange functional group selected from a sulfonic acid group, a phosphoric acid group, a carboxylic acid group, an imino diacetic acid group, a phosphoric ester group, and a combination thereof; an anion exchange functional group selected from a quaternary ammonium group, a tertiary amino group, a primary amino group, an imine group, a tertiary sulfonium group, a phosphonium group, a pyridyl group, a carbazolyl group, an imidazolyl group, and a combination thereof; and an amphoteric ion exchange functional group selected from betaine, sulfobetaine, and a combination thereof.

7. The ion exchanger of claim 1, wherein the at least one first cross-linkable functional group is selected from a substituted or unsubstituted C2 to C20 linear or branched alkenyl group, a substituted or unsubstituted C2 to C20 linear or branched alkynyl group, a halogen, —ROR' (wherein R is a substituted or unsubstituted C1 to C20 linear or branched alkylene group and R' is hydrogen or a C1 to C20 linear or branched alkyl group), an acyl halide group (—RC(=O)X, wherein R is a substituted or unsubstituted C1 to C20 linear or branched alkylene group, and X is a halogen), —RC(=O)OR' (wherein R is a substituted or unsubstituted C1 to C20 linear or branched alkylene group, and R' is hydrogen or a C1 to C20 linear or branched alkyl group), an isocyanate group, an acryloyloxy group, a methacryloyloxy group, an acrylate group, a methacrylate group, an acrylamido group, a methacrylamido group, a thiol group, and a combination thereof.

8. The ion exchanger of claim 1, wherein the monomers comprise at least one first ion exchange functional group comprising a cation exchange functional group selected from a-halogenated vinyl sulfonic acid, α,β,β'-halogenated vinyl sulfonic acid, methacrylic acid, acrylic acid, styrene sulfonic acid, vinyl sulfonic acid, maleic acid, itaconic acid, styrenephosphonic acid, maleic anhydride, vinyl phosphoric acid, salts thereof, esters thereof, and a combination thereof; or a monomer comprising an anion exchange functional group selected from vinyl pyridine, methyl vinyl pyridine, ethyl vinyl pyridine, vinyl pyrrolidone, vinyl carbazole, vinyl imidazole, amino styrene, alkylamino styrene, alkylamino styrene, trialkyl aminostyrene, methyl vinyl ketone, chloromethylstyrene, acrylamide, methacrylamide, and a combination thereof.

9. The ion exchanger of claim 1, wherein the cross-linking agent comprising at least two second cross-linkable functional groups comprises an aromatic compound comprising at least two cross-linkable functional groups, an alicyclic compound comprising at least two cross-linkable functional groups, or an aliphatic compound comprising at least two cross-linkable functional groups.

10. The ion exchanger of claim 1, wherein the cross-linking agent comprising at least two second cross-linkable functional groups is selected from a divinyl-based compound selected from m-divinyl benzene, divinyltoluene, divinylxylene, p-divinyl benzene, o-divinyl benzene, divinyl sulfone, butadiene, chloroprene, isoprene, trivinyl benzene, divinyl naphthalene, diallyl amine, triarylamine, divinyl pyridine, divinyldiphenyl ether, divinyldiphenylsulfone, and a combination thereof; an acrylate compound selected from alkylene diacrylate, alkylene dimethacrylate, and a combination thereof; and a combination thereof.

11. The ion exchanger of claim 1, wherein the monomers and the cross-linking agent are present in a weight ratio of about 1:0.5 to about 1:20.

12. The ion exchanger of claim 11, wherein the microporous polymer matrix has an average pore size of about 2 nm to about 100 nm.

13. The ion exchanger of claim 1, wherein the ion exchanger has a permeability coefficient of about 5 to about 25 L/hr·m·atm.

14. The ion exchanger of claim 1, wherein the ion exchanger has an electrical conductivity of about 2500 to about 15,000 μS/cm.

15. The ion exchanger of claim 1, wherein the ion exchanger has a porosity of about 80% to about 99%.

16. The ion exchanger of claim 1, wherein the ion exchanger has a specific surface area of about 100 m$^2$/g to about 1000 m$^2$/g.

17. An ion exchange filter device comprising the ion exchanger according to claim 1.

18. An electro-deionization device comprising the ion exchanger according to claim 1.

19. A method of manufacturing an ion exchanger, comprising:
   preparing an open-celled polymer support;
   preparing a composition comprising monomers having at least one first ion exchange functional group and at least one first cross-linkable functional group, a cross-linking agent having at least two second cross-linkable functional groups, a polymerization initiator, and a solvent;
   impregnating the open-celled polymer support with the composition;
   conducting a polymerization of the monomers and the cross-linking agent; and
   removing the solvent to form a microporous polymer matrix within the open-celled polymer support, the microporous polymer matrix comprising an ion conductive polymer, the ion conductive polymer being a polymerized product of the monomers and the cross-linking agent, the monomers comprising the at least one first ion exchange functional group and the at least one first cross-linkable functional group, the cross-linking agent comprising the at least two second cross-linkable functional groups, the open-celled polymer support comprising a second ion exchange functional group.

20. The method of manufacturing an ion exchanger of claim 19, wherein the open-celled polymer support has a porosity of greater than or equal to about 70%.

21. The method of manufacturing an ion exchanger of claim 19, wherein the open-celled polymer support has a cell size of greater than or equal to about 45 ppi (pores per inch).

22. The method of manufacturing an ion exchanger of claim 19, wherein the open-celled polymer support comprises a polymer selected from polyurethane, polyolefin, polyvinylchloride, polycarbonate, polyester, polymethylacrylate, polymethylmethacrylate, polyurea, polyether, polyisocyanurate, and a combination thereof.

23. The method of manufacturing an ion exchanger of claim 19, wherein the open-celled polymer support is included in an amount of about 3 to about 50 wt %, based on a total weight of the ion exchanger.

24. The method of manufacturing an ion exchanger of claim 19, wherein the at least one first ion exchange functional group comprises a cation exchange functional group selected from a sulfonic acid group, a phosphoric acid group, a carboxylic acid group, an imino diacetic acid group, a phosphoric ester group, and a combination thereof; an anion exchange functional group selected from a quaternary ammonium group, a tertiary amino group, a primary amino group, an imine group, a tertiary sulfonium group, a phosphonium group, a pyridyl group, a carbazolyl group, an imidazolyl group, and a combination thereof; and an amphoteric ion exchange functional group selected from betaine, sulfobetaine, and a combination thereof.

25. The method of manufacturing an ion exchanger of claim 19, wherein the at least one first cross-linkable functional group is selected from a substituted or unsubstituted C2 to C20 linear or branched alkenyl group, a substituted or unsubstituted C2 to C20 linear or branched alkynyl group, a halogen, —ROR' (wherein R is a substituted or unsubstituted C1 to C20 linear or branched alkylene group and R' is hydrogen or a C1 to C20 linear or branched alkyl group), an acyl halide group (—RC(=O)X, wherein R is a substituted or unsubstituted C1 to C20 linear or branched alkylene group, and X is a halogen), —RC(=O)OR' (wherein R is a substituted or unsubstituted C1 to C20 linear or branched alkylene group, and R' is hydrogen or a C1 to C20 linear or branched alkyl group), an isocyanate group, an acryloyloxy group, a methacryloyloxy group, an acrylate group, a methacrylate group, an acrylamido group, a methacrylamido group, a thiol group, and a combination thereof.

26. The method of manufacturing an ion exchanger of claim 19, wherein the monomers include at least one having a cation exchange functional group selected from α-halogenated vinyl sulfonic acid, α,β,β'-halogenated vinyl sulfonic acid, methacrylic acid, acrylic acid, styrene sulfonic acid, vinyl sulfonic acid, maleic acid, itaconic acid, styrenephosphonic acid, maleic anhydride, vinyl phosphoric acid, salts thereof, esters thereof, and a combination thereof; or a monomer having an anion exchange functional group selected from vinyl pyridine, methyl vinyl pyridine, ethyl vinyl pyridine, vinyl pyrrolidone, vinyl carbazole, vinyl imidazole, amino styrene, alkylamino styrene, alkylamino styrene, trialkyl aminostyrene, methylvinyl ketone, chloromethylstyrene, acrylamide, methacrylamide, and a combination thereof.

27. The method of manufacturing an ion exchanger of claim 19, wherein the cross-linking agent having at least two second cross-linkable functional groups comprises an aromatic compound having at least two cross-linkable functional groups, an alicyclic compound having at least two cross-linkable functional groups, or an aliphatic compound having at least two cross-linkable functional groups.

28. The method of manufacturing an ion exchanger of claim 19, wherein the cross-linking agent having at least two second cross-linkable functional groups is selected from a divinyl-based compound selected from m-divinyl benzene, divinyltoluene, divinylxylene, p-divinyl benzene, o-divinyl benzene, divinyl sulfone, butadiene, chloroprene, isoprene, trivinyl benzene, divinyl naphthalene, diallyl amine, triarylamine, divinyl pyridine, divinyldiphenyl ether, divinyldiphenylsulfone, and a combination thereof; an acrylate compound selected from alkylene diacrylate, alkylene dimethacrylate, and a combination thereof; and a combination thereof.

29. The method of manufacturing an ion exchanger of claim 19, wherein the monomers and the cross-linking agent are used in a weight ratio of about 1:0.5 to about 1:20.

30. An ion exchanger, comprising:
an open-celled polymer support; and
a microporous polymer matrix within the open-celled polymer support, the microporous polymer matrix comprising an ion conductive polymer, the ion conductive polymer being a polymerized product of monomers and a cross-linking agent, the monomers comprising at least one first ion exchange functional group and at least one first cross-linkable functional group, the cross-linking agent comprising at least two second cross-linkable functional groups, the open-celled polymer support comprising a second ion exchange functional group,
wherein the monomers and the cross-linking agent are present in a weight ratio of about 1:1 to about 1:20.

31. An ion exchanger, comprising:
an open-celled polymer support; and
a microporous polymer matrix within the open-celled polymer support, the microporous polymer matrix comprising an ion conductive polymer, the ion conductive polymer being a polymerized product of monomers and a cross-linking agent, the monomers comprising at least one first ion exchange functional group and at least one first cross-linkable functional group, the cross-linking agent comprising at least two second cross-linkable functional groups, the open-celled polymer support comprising a second ion exchange functional group,
wherein the cross-linking agent comprises an aromatic compound comprising at least two cross-linkable functional groups and a C2 to C30 heteroarylene group comprising a heteroatom of N, O, or S, or a combination thereof, or an alicyclic compound comprising at least two cross-linkable functional groups and a C2 to C30 heterocycloalkylene group comprising a heteroatom of N or S, or a combination thereof.

* * * * *